United States Patent [19]

Zimmerman

[11] Patent Number: 4,509,179
[45] Date of Patent: Apr. 2, 1985

[54] VACUUM SINTERING AND HOT ISOSTATIC PRESSING IN THE SAME VESSEL

[75] Inventor: Franz X. Zimmerman, Erie, Pa.

[73] Assignee: Autoclave Engineers, Inc., Erie, Pa.

[21] Appl. No.: 536,313

[22] Filed: Sep. 27, 1983

[51] Int. Cl.³ .............................................. F27B 1/26
[52] U.S. Cl. .................................. 373/109; 373/110; 373/111
[58] Field of Search .............. 373/109, 110, 111, 112, 373/128, 135

[56] References Cited

U.S. PATENT DOCUMENTS 4,268,708 5/1981 Smith, Jr. et al. .............. 373/128 X Primary Examiner—Reinhard J. Eisenzopf
Assistant Examiner—Susan A. Steward
Attorney, Agent, or Firm—Webb, Burden, Robinson & Webb

[57] ABSTRACT

An apparatus for heating a workpiece at elevated temperatures both under vacuum and under superatmospheric pressures comprises a vacuum pressure vessel comprising a cylindrical pressure shell having an inner cylindrical sealing face near the upper edge thereof and a cover at one axial end and a bottom plug at the other axial end. Both are arranged to be placed within a reaction frame bearing thereupon. A furnace within the shell has an insulating hood for protecting the shell from the heated workspace. A vacuum manifold is mounted to the top edge of the cylindrical shell and is sealed thereto. The manifold has a cylindrical interior through which the cover passes and an inner cylindrical sealing face at the upper end thereof. Mechanically powered means are provided for raising and lowering the cover and placing it in a first or a second position. Means associated with the cover provide an interior vacuum seal between the cover and the inner cylindrical sealing face on the manifold when the cover is in the first position, and form an interior pressure seal with the inner cylindrical sealing face on the cylindrical shell when the cover is in the second position. A port in the manifold is exposed to the interior of the vessel when the cover is in the first position. The port has a cross sectional area of at least eight square inches.

7 Claims, 3 Drawing Figures

VACUUM SINTERING AND HOT ISOSTATIC PRESSING IN THE SAME VESSEL

DESCRIPTION

Background

This invention relates to an autoclave furnace especially suitable for use in processes for vacuum sintering of materials following hot isostatic pressing. Sintered bodies of near theoretical density may be prepared from particulate matter by sintering under vacuum until open interconnecting porosity connected with the surface has been eliminated and thereafter by hot isostatic pressing until the remaining porosity is removed. The current state of the art is to sinter a partially dense body in a separate vacuum furnace and attain 95% theoretical density; then hot isostatic pressing until achieving 100% theoretical density. The process is old and is taught, for example, in U.S. Pat. No. 3,562,371.

Single furnaces that may be used for both the vacuum sintering and the hot isostatic pressing steps in the above described process are known. See, for example, U.S. Pat. No. 4,268,708 and British Pat. No. 1,300,863. During the vacuum sinter, the ambient conditions within the workspace of the furnace may be, for example, 1500° C. and a vacuum of $5 \times 10^{-1}$ torr. During hot isostatic pressing, the ambient conditions within the workspace may be, for example, 1400° C. and 800 to 1200 bar.

To date, the vacuum levels achievable have been in the vicinity of $10^{-1}$ torr. The problem has been that no matter how powerful the vacuum pumps, a small port and vacuum valve will limit the vacuum to $10^{-1}$ torr. Greater vacuums, say in the nature of $10^{-5}$ torr are desired. At very low pressures, flow becomes almost entirely dependent on the geometry of the conduits and other apparatus between the pumps and the vessel. A small orifice will make a larger, more powerful vacuum pump useless. A vacuum of $10^{-5}$ torr at 800° to 1500° C. is required for vacuum sintering certain stainless steels and titanium alloys.

SUMMARY OF THE INVENTION

Briefly according to this invention, there is provided an apparatus for heating a workpiece at elevated temperatures both under vacuum and under superatmospheric pressures. The apparatus comprises a vacuum pressure vessel including a cylindrical pressure shell. The pressure shell has an inner cylindrical sealing face near the upper edge thereof. A cover is provided at one axial end of the pressure shell and a bottom plug at the other axial end. Both are arranged to be placed within a reaction frame bearing thereupon. A furnace is placed within the shell having an insulating hood for protecting the shell from the heated workspace. A vacuum manifold is mounted to the top edge of the cylindrical shell. The vacuum manifold is sealed thereto. The manifold has a cylindrical interior through which the cover passes. The manifold also has an inner cylindrical sealing face at the upper edge thereof. Mechanically powered means are arranged for raising and lowering the cover and placing it in a first vacuum sintering position and in a second hot isostatic pressing position. Means associated with the cover provide a vacuum seal between the cover and the inner cylindrical sealing face on the manifold when the cover is in the first position. The same means provide a pressure seal with the inner cylindrical sealing face of the cylindrical shell when the cover is in the second position. A portion of the manifold is exposed to the interior of the vessel when the cover is in the first position. A port having a cross sectional area of at least eight square inches is in communication with the manifold.

Preferably, means are provided for locking the cover in the first and second positions comprising first and second sets of bores in the outer cylindrical face of the cover and an automatically activated pin slidably journaled in blocks fixed to the manifold. When the cover is in the first position, the pins can be inserted in the first set of bores and when the cover is in the second position, the pins are inserted in the second set of bores.

A system for vacuum sintering and hot isostatic pressing comprises the apparatus described in the preceding two paragraphs. It further comprises a vacuum conduit connected to the manifold port with a vacuum pump connected to said conduit. A valve is placed in the conduit such that when open it provides a cross sectional flow area of at least eight square inches. Conduits and sources are provided for introducing purged gases into the vessel usually through the bottom plug. Conduits and sources are also provided for introducing pressurizing gases into the vessel. A pressure sensor in communication with the pump conduit and/or the manifold is provided to detect the manifold pressure. Preferably, control means are provided responsive to the pressure sensor for, at the end of the vacuum sintering portion of a cycle, locking the pins in the first set of bores until pressure has been equalized between the vessel interior and the atmosphere.

DESCRIPTION OF THE DRAWINGS

Further features and other objects and advantages of this invention will become clear from the description of the preferred embodiments made with reference to the drawings.

DESCRIPTION OF THE PREFERRED EMBODIMENTS

Figure 1:
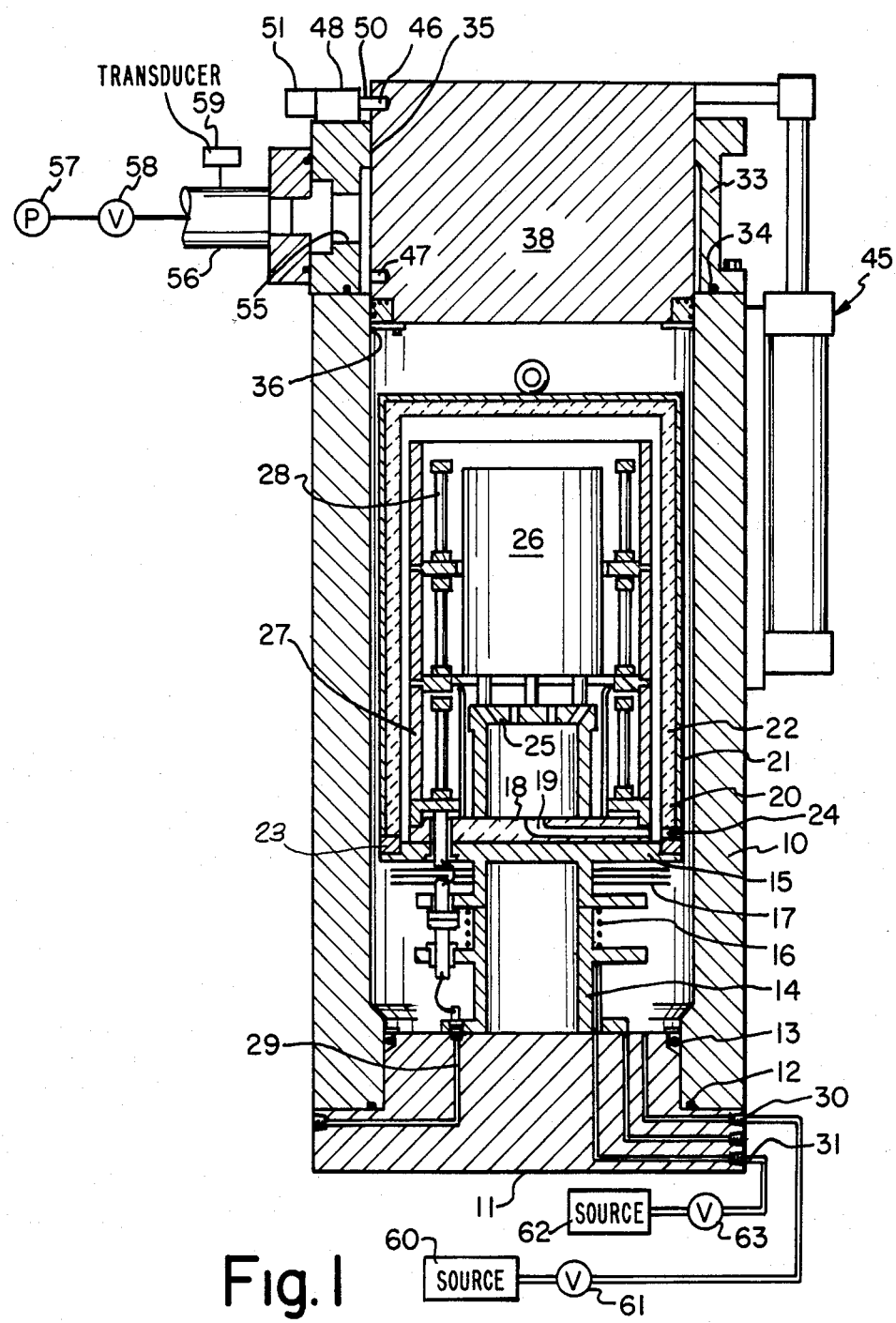
FIG. 1 is a section through a vacuum pressure furnace according to this invention with the cover in the pressure position.

Referring now to FIG. 1, the vacuum pressure furnace according to this invention comprises an elongate cylindrical pressure shell 10 sized to withstand pressures in the vicinity of 30,000 to 50,000 psi. The lower end of the shell 10 is closed by a bottom plug 11 having a flat unobstructed bottom surface. The bottom plug is sealed to the shell by O-rings 12 and 13 that are arranged to be pressurized from either inside or outside of the vessel. Resting upon the bottom plug is a foot 14 for supporting the platform 15 for the furnace. The foot 14 may be water-cooled by coil 16 passing through the bottom plug to a heat exchanger or reservoir or a pump. The foot may also support a radiation shield 17.

Over the top surface of platform 15 is an insulating furnace bottom 18, for example, a fired clay or insulating brick structure. A furnace hood 20 resting upon the furnace bottom comprises an inverted cup-shaped steel case 21 with an insulating lining 22 of fired clay or insulating brick. The lining 22 rests upon a steel bottom ring 23 that is fastened to the case 21 enabling the hood to be moved as a unit. Resting upon the bottom 18 is a hollow perforated pedestal 25. Supported from the pedestal is the workpiece 26.

Rising from the bottom 18 is a heat shield and heating element support 27. Heating elements 28 are supported from the shield 27 above and below the top of the pedestal. The electrical power for the heating element is passed through the electrical insulated gas tight conduit 29 in the bottom plug. A passage 30 is provided to introduce the high pressure isostatic pressing medium and a passage 31 is provided for low pressure purged gases. Optionally, another passage is provided for removing the high pressure pressing medium from the vessel.

The insulating bottom 18 is provided with a plurality of passages 19 connecting the interior of the pedestal to the space exterior of heat shield 27. The bottom of the hood 20 is also provided with a plurality of passages 24 connecting the space exterior of the shell and interior of the hood to the exterior of the hood. The total cross sectional area of the passages 19 should exceed eight square inches. The same may be said for the passages 24. The passages facilitate removal of gases from the workspace during the vacuum mode.

Some of what has been described to this point in the application has been described and amplified in U.S. Pat. Nos. 4,126,757; 4,247,755; 4,249,032; and 4,268,708—all incorporated herein by reference. All of the above patents are assigned to the same assignee as this application.

Setting atop the cylindrical shell is a vacuum manifold 33. It is sized to withstand pressures of at least two atmospheres outside/inside and vice versa. The manifold is secured by bolts to the cylindrical shell and is sealed thereto by O-ring 34. The manifold is generally annular and is provided with an inner cylindrical sealing face 35 near the upper edge. The cylindrical shell 10 also has an inner cylindrical sealing face 36 near the top edge thereof. The diameter of the sealing faces on both the cylindrical shell and the vacuum manifold are substantially identical.

A cover 38 or top plug is arranged to pass down through the manifold 33 and to enter the top opening of the cylindrical shell 10. The cover has a flat unobstructed top face.

Figures 2, 3:
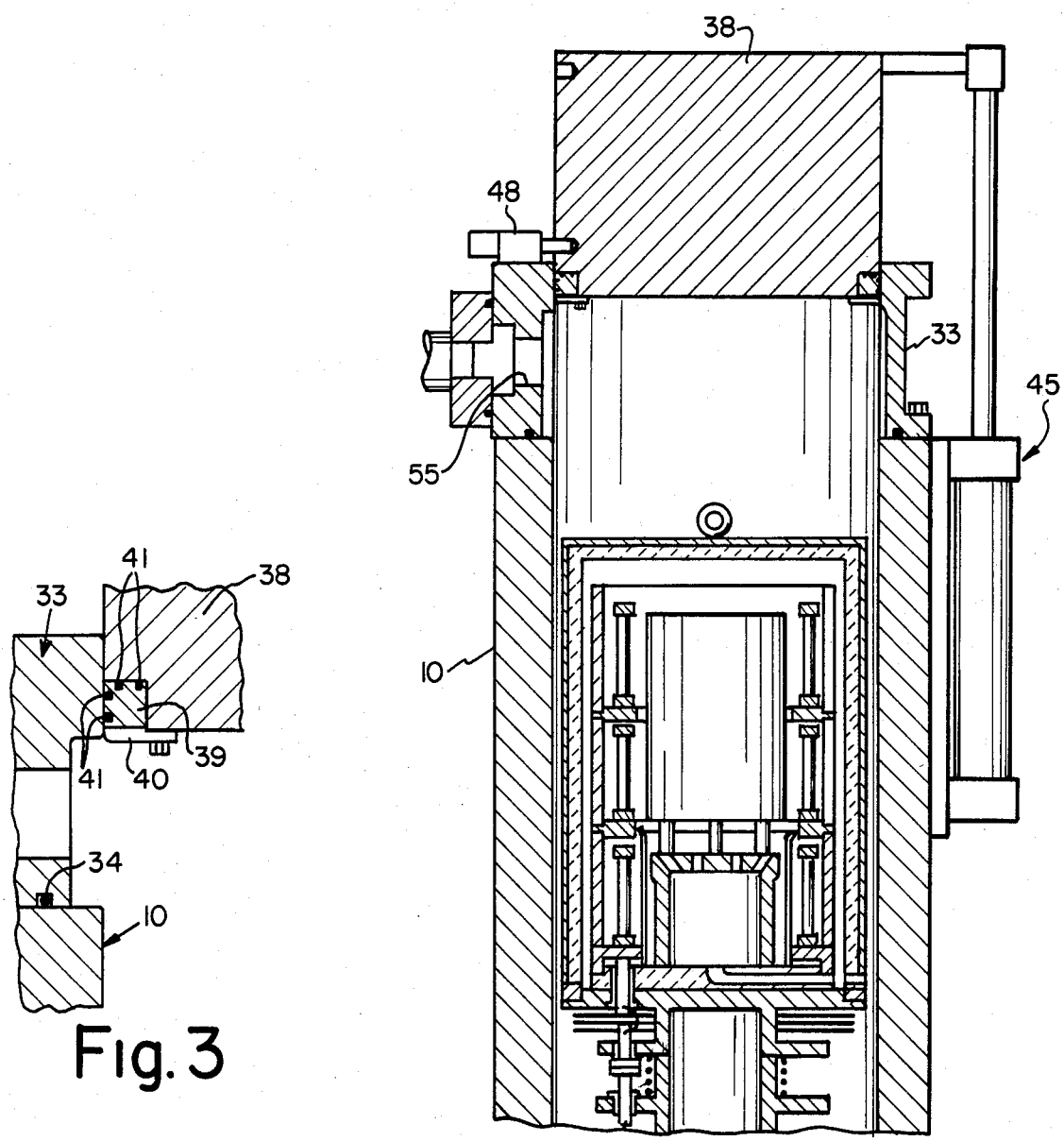
FIG. 2 is a similar section with the cover in the vacuum position.
FIG. 3 is a detail of the double O-ring retainer and associated sealing apparatus for the cover.

Referring now to FIG. 3, the cover 38 is provided with an annular recess at the lower edge thereof for receiving a retaining ring 39 held in place by hold-down ring 40 bolted to the bottom of the cover. The retaining ring is provided with a pair of O-ring grooves on the outer cylindrical face and two O-ring grooves on the axial face abutting the cover. Four O-rings 41 are secured in the grooves. The O-rings in the grooves on the outer cylindrical surface may seal against the inside face of the manifold or the inside face of the vessel as the case may be.

A lifting device such as an expandable hydraulic ram 45 is fixed at one end relative to the shell 10 and at the other end to the cover 38. The lifting device can position the cover at a first position (shown in FIG. 2) for vacuum operation, in a second position (shown in FIG. 1) for pressure operation, or can raise the cover clear of the vessel to provide access to the hood 20. When the hood is removed, access is provided to the workpiece 26.

The cover 38 is provided with a first set of radial bores (one shown at 46) and a second set of radial bores (one shown at 47). Mounted to the top of the manifold are a plurality of journal blocks (one shown at 48) for slidably journaling pins (one shown at 50). Preferably the pins are electrically actuated to slide within the journal blocks. Thus when the cover 38 is raised to its first position, the pins can engage the first set of bores to secure the cover for vacuum operation (see FIG. 2). On the other hand, when the cover is lowered to its second position, the pins can be inserted in the second set of bores preparatory for pressure operation. In this position, the entire vessel is moved relative to the reaction frame that engages the top surface of the cover and the bottom surface of the bottom plug. It is the reaction frame which takes up the axial forces of the vessel during high pressures and not the pins. In fact, the pins might well be removed after the pressurization beings. For a teaching of a suitable reaction frame see, for example, U.S. Pat. No. 4,155,476 incorporated herein by reference.

When the cover is placed in the first (up) position, a large port 55 is exposed. Preferably, the port has a diameter of four or five inches thus enabling a pressure of $10^{-5}$ torr to be drawn upon the vessel. The cross section of the port 55 should be, say, at least eight square inches. Notwithstanding the large port in the manifold, the vessel can be pressurized to 30,000 to 50,000 psi without concern for the strength of the vacuum lines and the valves secured to port 55. These are isolated from the interior of the vessel when the cover is in the second position.

A system for using the vacuum pressure furnace would have a conduit 56 extending away from port 55 to mechanical and turbomolecular vacuum pumps 57. Placed in the conduit is a valve 58 that, when open, does not reduce the cross section of the conduit below about, say, eight square inches (the pump 57 and the valve 58 are shown schematically in FIG. 1). Also, in communication with the conduit 56 is a vacuum pressure transducer 59.

In one mode of operation, the vessel has a source 60 of pressurizing gases connected via valve 61 to passage 30 in the bottom plug and a source 62 of low pressure (near atmospheric) purged gases connected via valve 63 to the passage 31 in the bottom plug. (The sources 60, 62, and associated valves 61, 63 are shown schematically in FIG. 1.)

Operation

The operation of the vacuum pressure vessel and system for vacuum sintering and hot isostatic pressing disclosed herein is basically as follows: With the cover 38 entirely removed, the workpiece 26 is placed on the pedestal and the hood 20 is placed over the workpiece. The top cover 38 is then lowered through the manifold. The cover is then placed in a first position (as shown in FIG. 1) for vacuum sintering. The pins 50 are actuated to hold the cover in place and to withstand the approximately one atmosphere of pressure to be applied thereto as a vacuum is drawn.

During the evacuation of the vessel, purged gases may be introduced from a source 62 through the valve 63. For highest vacuums, the introduction of purged gases must be discontinued. After the vacuum sintering step is completed, the vacuum must be removed, for example, by introducing sufficient purged gas to equalize the internal and external pressures. When the pressures, as measured by the transducer 59 are equal the pins 50 can be withdrawn. Two means prevent withdrawal of the pins 50 with a vacuum still upon the vessel. The actuators for the pins are interlocked with the transducer 59 and the force on the pins when a vacuum is drawn binds the pins.

With the pressure equalized, the ram can be moved to place the cover 38 in the second position (shown in FIG. 1) sealing the vessel for high pressures. Thus the vacuum manifold and devices in communication therewith are not pressurized. The vessel is pressurized from source 60 via valve 61. Under the conditions of pressure and temperature, the workpiece may be sintered quickly to near theoretical density.

Having thus defined my invention with the detail and particularity required by the Patent Laws, what is desired protected by Letters Patent is set forth in the following claims.

I claim:

1. An apparatus for heating a workpiece at elevated temperatures both under vacuum and under superatmospheric pressures comprising:
   (a) a vacuum pressure vessel comprising a cylindrical pressure shell having an inner cylindrical sealing face near the upper edge thereof and a cover at one axial end and a bottom plug at the other axial end, both arranged to be placed within a reaction frame bearing thereupon;
   (b) a furnace within the shell having an insulating hood for protecting the shell from the heated workspace;
   (c) a vacuum manifold mounted to the top edge of the cylindrical shell and being sealed thereto, said manifold having a cylindrical interior through which the cover passes and an inner cylindrical sealing face at the upper end thereof;
   (d) mechanically powered means for raising and lowering the cover and placing it in a first or a second position;
   (e) means associated with the cover providing an interior vacuum seal between the cover and the inner cylindrical sealing face on the manifold when the cover is in the first position, and forming an interior pressure seal with the inner cylindrical sealing face on the cylindrical shell when the cover is in the second position; and
   (f) a port in the manifold exposed to the interior of the vessel when the cover is in the first position, said port having a cross sectional area of at least eight square inches.

2. The apparatus according to claim 1 further comprising means for locking the cover in the first and second positions.

3. Apparatus according to claim 1 wherein said furnace has a hollow perforated pedestal extending up into the workspace and the furnace has a bottom upon which the pedestal rests, said bottom having passages therein to provide communication between the interior of the pedestal and the exterior of the insulating hood.

4. Apparatus according to claim 3 wherein said passages have a total cross sectional area of at least eight square inches.

5. Apparatus according to claim 3 wherein the perforations in the hollow pedestal have a total cross sectional area of at least eight inches.

6. Apparatus according to claim 2 wherein the locking means comprise first and second sets of bores in the outer cylindrical face of the cover plug and automatically activated pins slidably journaled in blocks fixed to the top of the manifold whereby when the cover is in a first position the pins can be inserted into the first set of bores and when the cover is the second position the pins are inserted in said second set of bores.

7. Apparatus according to claim 1 wherein the lower edge of the cover has an annular recess into which fits a hold-down ring, a retaining ring being fastened to the lower edge of the cover secures the hold-down ring, the hold-down ring has at least two annular grooves on an exterior cylindrical face thereof and at least two annular grooves in the axial face thereof abutting said cover, and O-rings secured in said grooves.

* * * * *